United States Patent
Okazaki

(10) Patent No.: US 10,399,074 B2
(45) Date of Patent: Sep. 3, 2019

(54) CERAMIC HONEYCOMB STRUCTURE

(71) Applicant: HITACHI METALS, LTD., Tokyo (JP)

(72) Inventor: Shunji Okazaki, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 58 days.

(21) Appl. No.: 15/555,759

(22) PCT Filed: Jan. 26, 2016

(86) PCT No.: PCT/JP2016/052181
§ 371 (c)(1),
(2) Date: Sep. 5, 2017

(87) PCT Pub. No.: WO2016/152236
PCT Pub. Date: Sep. 29, 2016

(65) Prior Publication Data
US 2018/0050333 A1 Feb. 22, 2018

(30) Foreign Application Priority Data

Mar. 24, 2015 (JP) ................................. 2015-061183

(51) Int. Cl.
*B01J 35/04* (2006.01)
*C04B 38/04* (2006.01)
(Continued)

(52) U.S. Cl.
CPC .......... *B01J 35/04* (2013.01); *B01D 46/2429* (2013.01); *B01D 46/2451* (2013.01);
(Continued)

(58) Field of Classification Search
CPC ............ C04B 38/0006; C04B 38/0054; C04B 38/0074; C04B 35/195; B01D 2046/2433; B01D 2046/2429; B01D 2046/2437
(Continued)

(56) References Cited

U.S. PATENT DOCUMENTS

| 6,457,939 B2* | 10/2002 | Ghasripoor ........... F01D 11/122 |
| | | 415/174.4 |
| 2007/0033912 A1* | 2/2007 | Furukawa ........... C04B 38/0006 |
| | | 55/523 |

(Continued)

FOREIGN PATENT DOCUMENTS

| EP | 2228115 A1 | 9/2010 |
| EP | 2455153 A1 | 5/2012 |

(Continued)

OTHER PUBLICATIONS

Extended European Search Report dated Oct. 18, 2018 issued by the European Patent Office in counterpart application No. 16768139.4.
(Continued)

*Primary Examiner* — Tri V Nguyen
(74) *Attorney, Agent, or Firm* — Sughrue Mion, PLLC

(57) ABSTRACT

A ceramic honeycomb structure comprising porous cell walls defining large numbers of flow paths, the cell walls having (a) porosity of 55% or more and less than 65%, and (b) 35,000/mm$^3$ or more of substrate branches, wherein the number of substrate branches is defined by the number of branch points (including connecting points of 3 or more branches and connecting points of different-width branches) per a unit volume, in a network structure obtained by the skeletonization of the three-dimensional structure of cell wall substrates determined by X-ray CT.

5 Claims, 5 Drawing Sheets

(51) Int. Cl.
*B01D 53/94* (2006.01)
*B01J 32/00* (2006.01)
*C04B 35/195* (2006.01)
*C04B 38/00* (2006.01)
*C04B 38/06* (2006.01)
*F01N 3/28* (2006.01)
*B01D 46/24* (2006.01)

(52) U.S. Cl.
CPC .............. *B01D 53/94* (2013.01); *B01J 32/00* (2013.01); *C04B 35/195* (2013.01); *C04B 38/00* (2013.01); *C04B 38/0006* (2013.01); *C04B 38/0074* (2013.01); *C04B 38/06* (2013.01); *F01N 3/28* (2013.01)

(58) Field of Classification Search
USPC .......................................... 428/116; 264/630
See application file for complete search history.

(56) References Cited

U.S. PATENT DOCUMENTS

| | | | |
|---|---|---|---|
| 2008/0004171 | A1 | 1/2008 | Melscoet-Chauvel et al. |
| 2008/0032090 | A1 | 2/2008 | Beall et al. |
| 2008/0032091 | A1 | 2/2008 | Beall et al. |
| 2008/0057267 | A1 | 3/2008 | Brocheton et al. |
| 2009/0220734 | A1 | 9/2009 | Backharicoult et al. |
| 2010/0205921 | A1 | 8/2010 | Okazaki et al. |
| 2012/0148792 | A1 | 6/2012 | Okazaki |
| 2012/0317947 | A1 | 12/2012 | Okazaki |
| 2014/0103560 | A1 | 4/2014 | Okazaki |
| 2015/0107206 | A1 | 4/2015 | Sakashita et al. |
| 2015/0251124 | A1 | 9/2015 | Okazaki |
| 2015/0273380 | A1* | 10/2015 | Sakashita .............. C04B 38/009 55/522 |
| 2015/0367335 | A1 | 12/2015 | Okazaki |
| 2016/0250577 | A1 | 9/2016 | Okazaki |
| 2017/0304762 | A1 | 10/2017 | Okazaki |

FOREIGN PATENT DOCUMENTS

| | | |
|---|---|---|
| EP | 3275853 A1 | 1/2018 |
| JP | 2005-052750 A | 3/2005 |
| JP | 2009-542570 A | 12/2009 |
| JP | 2011-51 6371 A | 5/2011 |
| JP | 2011-177704 A | 9/2011 |
| WO | 2011/027837 A1 | 3/2011 |
| WO | 2011/102487 A1 | 8/2011 |
| WO | 2013/146499 A1 | 10/2013 |
| WO | 2014/163036 A1 | 10/2014 |
| WO | 2015/046242 A1 | 4/2015 |

OTHER PUBLICATIONS

International Search Report for PCT/JP2016/052181 dated Mar. 22, 2016 [PCT/ISA/210].

* cited by examiner

Fig. 6 (Amended)
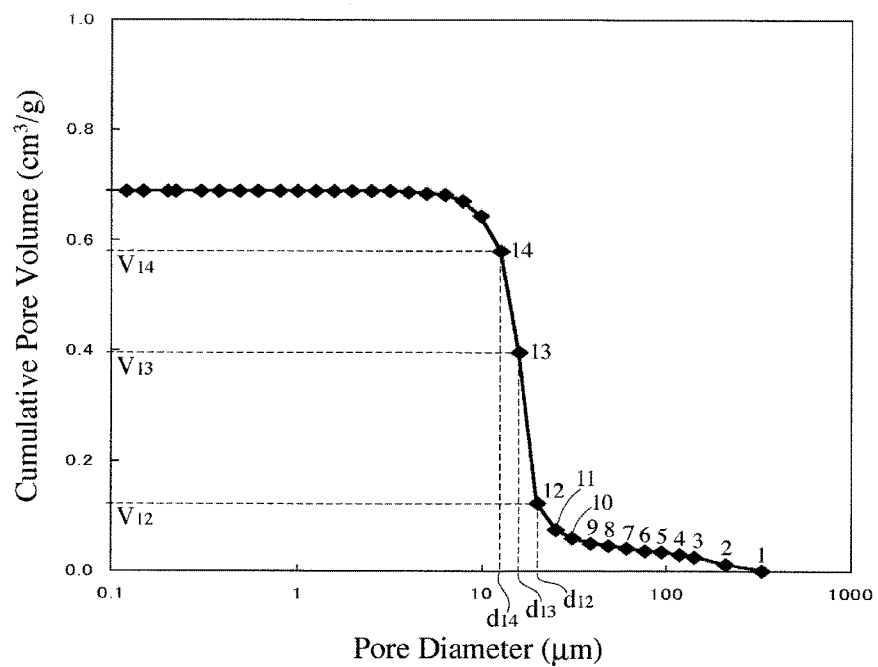

CERAMIC HONEYCOMB STRUCTURE

CROSS REFERENCE TO RELATED APPLICATIONS

This application is a National Stage of International Application No. PCT/JP2016/052181 filed Jan. 26, 2016 (claiming priority based on Japanese Patent Application No. 2015-061183 filed Mar. 24, 2015), the contents of which are incorporated herein by reference in their entirety.

FIELD OF THE INVENTION

The present invention relates to a ceramic honeycomb structure used for a carrier supporting a catalytic material for removing harmful substance, particularly nitrogen oxide, from exhaust gases of diesel engines, gasoline engines, etc.

BACKGROUND OF THE INVENTION

Because exhaust gases discharged from internal engines such as diesel engines, gasoline engines, etc. contain harmful substances such as nitrogen oxide (NOx) and particulate matter (PM), exhaust pipes of the internal engines are provided with units for removing particulate matter, and units for removing nitrogen oxide. The nitrogen-oxide-removing units include an urea-SCR catalyst, in which urea injected into an exhaust pipe is turned to ammonia, which is reacted with nitrogen oxide in the exhaust gas to remove oxygen therefrom, thereby reducing nitrogen oxide to nitrogen, and thus removing nitrogen oxide from the exhaust gas. Attention is also paid to an HC-SCR catalyst technology using a diesel fuel (HC) as a reducing agent, which can be used without needing sufficient urea-supplying facilities.

An example of ceramic honeycomb structures used as a carrier for the SCR catalyst is shown in FIGS. 1 and 2. A ceramic honeycomb structure 10 comprises porous cell walls 2 defining large numbers of exhaust-gas-flowing paths 3, and an outer peripheral wall 1, with a catalytic material (not shown) carried by the porous cell walls 2.

To remove nitrogen oxide from the exhaust gas efficiently, as large an amount of a catalytic material as possible should be carried per a unit volume, such that the catalytic material carried by an SCR catalyst carrier comes into sufficient contact with the exhaust gas. Conventionally used to this end is an SCR catalyst comprising as a carrier a ceramic honeycomb structure having thin walls with a high cell density (for example, cell wall thickness: 0.05 mm, and cell wall pitch: 0.85 mm). However, such a honeycomb structure having thin walls with a high cell density has a small opening area in each exhaust-gas-flowing cell, suffering large pressure loss at its inlet.

To solve such a problem as increased pressure loss, JP 2005-052750 A discloses a ceramic honeycomb structure comprising cell walls having a thickness of 0.1-0.35 mm, a pitch of 1.0-2.0 mm, an average pore diameter of 15 μm or more, and porosity of 50-80%. JP 2005-052750 A describes that by optimizing the porosity and average pore diameter of cell walls of a honeycomb structure as a catalyst carrier without making the cell walls thinner with a higher cell density, the amount of a catalytic material carried per a unit volume can be increased to improve the cleaning efficiency of a NOx-removing ceramic honeycomb catalyst such as an SCR catalyst, and to reduce its size.

JP 2009-542570 A discloses a cordierite ceramic product having porosity of 64% or more and less than 80%, a median pore diameter d50 of 10-45 μm, a thermal expansion coefficient CTE of $3.0 \times 10^{-7}/°$ C. or more, and (i) CTE of less than $6.0 \times 10^{-7}/°$ C. at a median pore diameter d50 of 10 μm or more and less than 18 μm, (ii) CTE of less than $9.0 \times 10^{-7}/°$ C. at a median pore diameter d50 of 18 μm or more and less than 22 μm, (iii) CTE of less than $10.0 \times 10^{-7}/°$ C. at a median pore diameter d50 of 2-25 μm, (iv) CTE of less than $13.0 \times 10^{-7}/°$ C. at a median pore diameter d50 of more than 25 μm and less than 29 μm, and (v) CTE of less than $17.0 \times 10^{-7}/°$ C. at a median pore diameter d50 of 29-45 μm. JP 2009-542570 A describes that this ceramic product has drastically improved breakage strength coefficient and heat shock resistance despite high porosity, and that even with effective amounts of a catalyst and/or a NOx-absorbing material coated, the finely porous ceramic structure secures low pressure loss during cleaning and soot accumulation, thereby making the cordierite ceramic product suitable for catalyst-carrying, wall-flow filters for diesel particles. JP 2009-542570 A further describes that a narrow pore diameter distribution enables a more uniform distribution of a catalyst on pore wall surfaces, resulting in low pressure loss during cleaning and soot accumulation, providing increased chances of contacting the catalyst with soot and the exhaust gas, and thus higher use efficiency of the catalyst.

JP 2011-516371 A discloses a porous polycrystalline ceramic body having an anisotropic microstructure composed of oriented polycrystalline reticular formations, with an anisotropic factor (Af-pore long) meeting 1.2<Af-pore long<5, which can provide a ceramic article having a narrow pore diameter distribution, porosity of more than 50%, and a median pore diameter in a range of 12-25 μm. JP 2011-516371 A describes that this ceramic article exhibiting high strength, a low thermal expansion coefficient (CTE) and high porosity can be used for substrates of diesel or gasoline particulate filters, and functional filters such as catalyst filters having partial or complete NOx-adding functions, in automobiles.

WO 2011/102487 discloses a ceramic honeycomb structure comprising cell walls having (a) porosity of 55-80%, (b) a median pore diameter d 50 (measured by mercury porosimetry) of 5-27 μm, (c) pores open on the surface having an opening area ratio of 20% or more, (d) an area-based median opening diameter d50 (corresponding to an average equivalent circle diameter of pores open on the surface) of 10-45 μm, (e) the density of pores (having equivalent circle diameters of 10 μm or more and less than 40 μm) open on the surface being 350/mm² or more, (f) the maximum inclination of a curve of a cumulative pore volume to a pore diameter being 1.6 or more in a pore diameter distribution measured by mercury porosimetry, and (g) a ratio D50/d50 of the median pore diameter D50 to the median opening diameter d50 being 0.65 or less. WO 2011/102487 describes that a ceramic honeycomb filter comprising this ceramic honeycomb structure effectively captures nano-particles largely affecting the number of particles discharged even before PM is accumulated at an initial stage of use, resulting in an improved number-based capturing ratio of PM, with less deterioration of pressure loss characteristics when PM is accumulated.

WO 2011/027837 discloses a ceramic honeycomb structure comprising cell walls having porosity of 40-60%; the opening area ratio of pores open on the cell wall surfaces (the total opening area of pores per a unit cell wall surface area) being 15% or more; the area-based median opening diameter of the open pores being 10 μm or more and less than 40 μm, when the opening diameter of each pore open on the cell wall surfaces is expressed by an equivalent circle diameter (diameter of a circle having the same area as the opening area of a pore); the density of pores having equivalent circle diameters of 10 μm or more and less than 40 μm being 350/mm² or more; and the average circularity of pores having equivalent circle diameters of 10 μm or more and less than 40 μm being 1-2. WO 2011/027837 describes that because the ceramic honeycomb structure exhibits an improved PM-capturing ratio while keeping low pressure loss, at an early capturing stage after regeneration, it can efficiently capture nano-sized PM, which gathers attention under increasingly stricter exhaust gas regulations.

However, an SCR catalyst comprising as a carrier the ceramic honeycomb structure described in JP 2005-052750 A, the cordierite ceramic product described in JP 2009-542570 A, the porous ceramic body described in JP 2011-516371 A, and the ceramic honeycomb structure used in the ceramic honeycomb filters described in WO 2011/102487 and WO 2011/027837 fail to exhibit satisfactorily high cleaning efficiency under the recent demand of higher cleaning performance and higher efficiency, despite somewhat improved pressure loss characteristics and nitrogen-oxide-removing efficiency. When the amount of a catalytic material carried on cell walls is increased to obtain high cleaning efficiency, exhaust-gas-flowing paths have smaller opening areas, resulting in larger exhaust-gas-flowing resistance, and thus larger pressure loss. Also, an SCR catalyst comprising as a carrier the ceramic honeycomb structure used in the ceramic honeycomb filter described in WO 2011/102487 may have insufficient strength.

OBJECT OF THE INVENTION

Accordingly, an object of the present invention is to provide a ceramic honeycomb structure capable of carrying an increased amount of a catalytic material per a unit volume without increasing pressure loss, thereby having higher contact efficiency of an exhaust gas with the catalytic material, so that it can be used as a carrier for an SCR catalyst having excellent nitrogen-oxide-removing efficiency and high strength.

SUMMARY OF THE INVENTION

As a result of intensive research in view of the above object, the inventor has paid attention to the three-dimensional structure of substrates (skeletons) constituting a ceramic honeycomb structure, finding that the above object can be achieved by regulating the three-dimensional structure of the substrates determined by X-ray CT to a particular range. The present invention has been completed based on such finding.

Thus, the ceramic honeycomb structure of the present invention comprises porous cell walls defining large numbers of flow paths; the cell walls having (a) porosity of 55% or more and less than 65%; and
(b) 35,000/mm³ or more of substrate branches, wherein the number of substrate branches is defined by the number of branch points (including connecting points of 3 or more branches and connecting points of different-width branches) per a unit volume, in a network structure obtained by the skeletonization of the three-dimensional structure of cell wall substrates determined by X-ray CT.

The three-dimensional structure of the cell wall substrates determined by X-ray CT preferably meet the formula of $(d90-d10)/d50 \leq 1.25$, wherein d10, d50 and d90 are substrate diameters at cumulative substrate volumes corresponding to 10%, 50% and 90% of the total substrate volume, in a substrate volume distribution against the diameter of the substrate unit;

one substrate unit is a substrate portion between two adjacent branch points, which has the substrate diameter and the substrate volume;

the substrate diameter is determined by halving a sum of short and long diameters of the substrate unit in its transverse cross section; and the cumulative substrate volume is determined by cumulating the substrate volume from the minimum substrate diameter to a particular substrate diameter.

The d50 is preferably 10-20 μm. The d10 is preferably 8 μm or more.

The ceramic is preferably a cordierite-type ceramic.

EFFECTS OF THE INVENTION

Because an SCR catalyst comprising the ceramic honeycomb structure of the present invention as a carrier can carry a large amount of a catalytic material on and in cell walls, nitrogen oxide in a flowing exhaust gas is reacted with the catalytic material carried on cell wall surfaces and in pores open on the cell wall surfaces, resulting in a larger effect of removing nitrogen oxide than in conventional honeycomb structures.

Further, the ceramic honeycomb structure has high strength because of large numbers of substrate branches, suitable for a carrier not only for a catalytic material for removing harmful substance from exhaust gases discharged from diesel or gasoline engines, etc., but also for a catalytic material for removing nitrogen oxide from exhaust gases of gasoline engines.

BRIEF DESCRIPTION OF THE DRAWINGS

FIG. 6 is a graph showing the relation between a pore diameter and a cumulative pore volume measured by mercury porosimetry in the cell walls of the ceramic honeycomb structure of Example 2.

DESCRIPTION OF THE PREFERRED EMBODIMENTS

[1] Ceramic Honeycomb Structure

The ceramic honeycomb structure of the present invention comprises porous cell walls defining large numbers of flow paths, the cell walls having (a) porosity of 55% or more and less than 65%, and (b) 35,000/mm$^3$ or more of substrate branches. The number of substrate branches is the number of branch points (including connecting points of 3 or more branches and connecting points of different-width branches) per a unit volume, in a network structure obtained by the skeletonization of the three-dimensional structure of cell wall substrates determined by X-ray CT.

The ceramic honeycomb structure having such a structure can effectively carry a catalyst without increasing pressure loss, providing an SCR catalyst having excellent nitrogen-oxide-removing efficiency. Such structure provides a high-strength honeycomb structure.

(a) Porosity of Cell Walls

The porosity of the cell walls is 55% or more and less than 65%. The porosity of less than 55% provides large pressure loss, while the porosity of 65% or more reduces strength. The lower limit of the porosity is preferably 60% or more, more preferably 61%. The upper limit of the porosity is preferably 64%. The porosity of the cell walls is calculated from the total pore volume measured by mercury porosimetry described below and the true specific gravity of a ceramic forming the cell walls. For example, in the case of a ceramic honeycomb structure having cordierite cell walls, the true specific gravity of cordierite (=2.52 g/cm$^3$) is used for calculation.

(b) Substrate Structure of Cell walls

Figure 1:
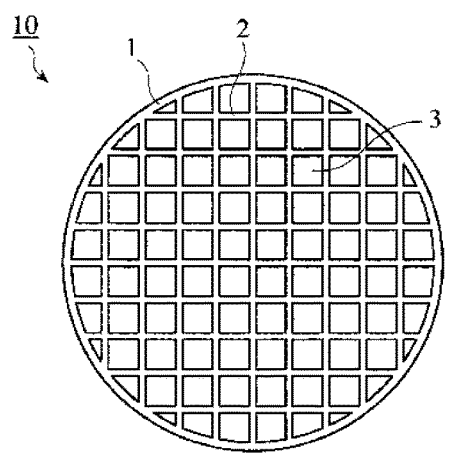
FIG. 1 is a front view schematically showing an example of ceramic honeycomb structures.
Figure 2:
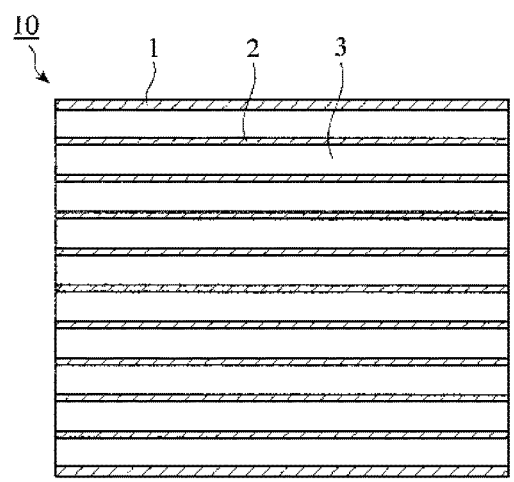
FIG. 2 is a longitudinal cross-sectional view schematically showing an example of ceramic honeycomb structures.
Figure 3:
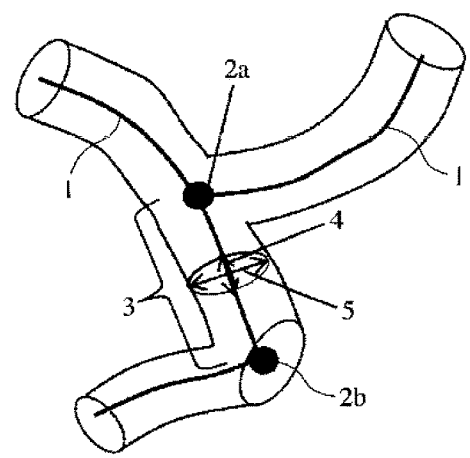
FIG. 3 is a schematic view showing the three-dimensional structure of a substrate.

The number of branches in the cell wall substrates is 35,000/mm$^3$ or more. The number of cell wall substrate branches is one of parameters expressing the three-dimensional structure of substrates constituting the cell walls, which is the number of branch points per a unit volume determined from network structures constituted by the three-dimensional skeletons as shown in FIG. 3. The branch points include connecting points 2a of 3 or more branches and connecting points 2b of different-width branches, in the network structures [expressed by lines comprising branches 1 and connecting points 2 (2a, 2b), which extend in center portions of the three-dimensional substrates, as shown in FIG. 3]. When the number of cell wall substrate branches is 35,000/mm$^3$ or more, the catalytic material is efficiently carried on the branched substrate surfaces, resulting in high contact efficiency of the catalytic material with an exhaust gas, and high strength. The number of substrate branches is preferably 40,000/mm$^3$ or more, more preferably 45,000/mm$^3$. The number of branches is preferably 60,000/mm$^3$ or less. When it is more than 60,000/mm$^3$, pores are too small to keep low pressure loss. For the same reasons, the number of branches is more preferably 55,000/mm$^3$ or less.

The three-dimensional structure of the cell wall substrates can be determined by X-ray CT. Continuous cross section images (sliced images) of the cell wall substrates determined by X-ray CT are stacked on a computer software to obtain a three-dimensional structure of the substrates as shown in FIG. 3. The network structure of substrates constituting the cell walls is a skeleton structure obtained by the skeletonization of the above three-dimensional structure by software. The following parameters including the number of substrate branches are defined based on this network structure.

A substrate portion between two adjacent branch points is defined herein as one substrate unit. The distance between two adjacent branch points is the length 3 of the substrate unit. An average of a short diameter 4 and a long diameter 5 in a transverse cross section of the substrate unit, which is obtained by dividing a sum of the short diameter 4 and the long diameter 5 by 2, is defined as a substrate diameter.

Figure 4:
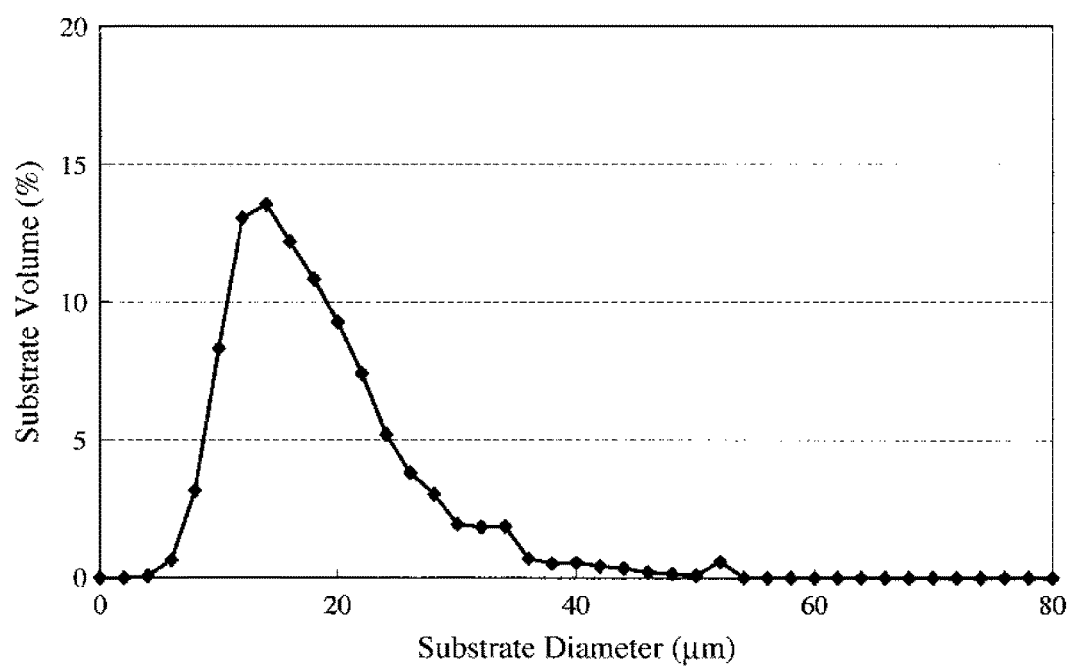
FIG. 4 is a graph showing a substrate volume distribution against a substrate unit diameter.
Figure 5:
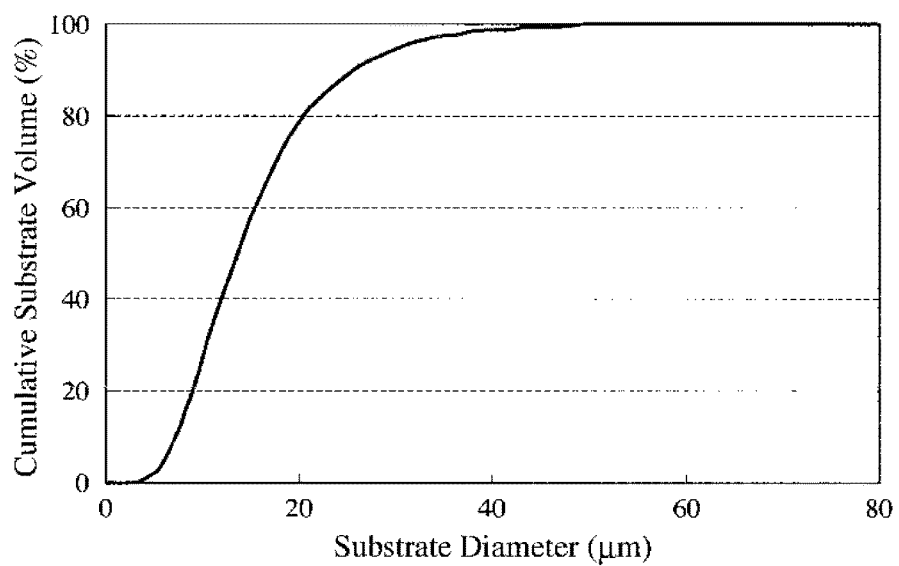
FIG. 5 is a graph showing the relation between a cumulative substrate volume and a substrate unit diameter.

As shown in FIG. 4, the substrate volume is plotted against a substrate unit diameter to obtain a substrate volume distribution against the substrate unit diameter (substrate diameter). In this distribution, the integration of the substrate volume from the minimum substrate diameter to a particular substrate diameter provides a cumulative substrate volume at the particular substrate diameter. The cumulative substrate volume is plotted against a substrate unit diameter in FIG. 5.

The cell walls of the ceramic honeycomb structure of the present invention have a substrate diameter d10 at a cumulative substrate volume corresponding to 10% of the total substrate volume, a substrate diameter d50 at a cumulative substrate volume corresponding to 50% of the total substrate volume, and a substrate diameter d90 at a cumulative substrate volume corresponding to 90% of the total substrate volume, which preferably meet the formula of (d90−d10)/d50≤1.25. The d10 represents a substrate diameter at a cumulative substrate volume corresponding to 10% of the total substrate volume, in a graph showing the relation between a cumulative substrate volume and a substrate unit diameter (see FIG. 5), and can be determined by the interpolation of points plotted in the graph and smoothing. The same is true of d50 and d90. (d90−d10)/d50 is a parameter expressing the inclination of a curve of the cumulative substrate volume plotted against the substrate diameter. The larger this parameter, the larger the inclination, meaning a sharper substrate volume distribution. When (d90−d10)/d50 is more than 1.25, the substrates locally suffer stress concentration in many sites, resulting in undesirably low strength. The value of (d90−d10)/d50 is more preferably 1.2 or less, most preferably 1.15 or less.

In the cell walls of the ceramic honeycomb structure of the present invention, the substrate diameter d50 at a cumulative substrate volume corresponding to 50% of the total substrate volume is preferably 10-20 μm. The d50 of less than 10 μm likely provides low strength, and the d50 of more than 20 μm likely makes it difficult to keep low pressure loss. The d50 is more preferably 12 μm or more. The d50 is more preferably 18 μm or less, most preferably 16 μm or less.

The substrate diameter d10 at a cumulative substrate volume corresponding to 10% of the total substrate volume is preferably 8 μm or more. When the d10 is less than 8 μm, stress is likely concentrated in small-diameter substrates, resulting in low strength. The d10 is more preferably 9 μm or more.

The substrate diameter d90 at a cumulative substrate volume corresponding to 90% of the total substrate volume is preferably 34 μm or less. The d90 of more than 34 μm likely provides small pores, making it difficult to keep low pressure loss. The d90 is more preferably 29 μm or less.

(c) Inclination of Cumulative Pore Volume Curve

In the relation of a cumulative pore volume to a pore diameter (logarithm) measured by mercury porosimetry, the maximum of the inclination $S_n$ of a cumulative pore volume curve is preferably 2.5 or more. The cumulative pore volume curve is obtained by plotting the cumulative pore volume (cm$^3$/g) against a logarithm of the pore diameter (μm). The inclination $S_n$ of the cumulative pore volume curve is determined from a pore diameter $d_{n-1}$ (μm) and a cumulative pore volume $V_{n-1}$ (cm$^3$/g) at the (n−1)-th measurement point, and a pore diameter $d_n$ (μm) and a cumulative pore volume $V_n$ (cm$^3$/g) at the n-th measurement point, by the formula of $S_n=-(V_n-V_{n-1})/[\log(d_n)-\log(d_{n-1})]$ expressing the inclination of the cumulative pore volume curve at the n-th measurement point. When the maximum of the inclination $S_n$ is less than 2.5, the ceramic honeycomb structure contains, in addition to many large pores, many small pores which cannot sufficiently carry a catalytic material, so that a larger amount of a catalyst is carried on the cell wall surfaces, resulting in a smaller opening area of exhaust-gas-flowing paths, and thus larger exhaust-gas-flowing resistance (larger pressure loss). The maximum of the inclination $S_n$ is preferably 3 or more, more preferably 3.5 or more, further preferably 4 or more, most preferably 4.5 or more.

The cumulative pore volume of cell walls is measured by mercury porosimetry. The measurement of a cumulative pore volume is conducted, for example, by using Autopore III 9410 available from Micromeritics. A test piece cut out of the ceramic honeycomb structure is set in a measurement cell, and the cell is evacuated. Thereafter, mercury is introduced into the cell under pressure to measure the volume of mercury pressed into pores in the test piece. Because mercury is introduced into finer pores at higher pressure, the relation between a pore diameter and a cumulative pore volume (cumulative volume of pores in a range from the maximum pore diameter to a particular pore diameter) can be determined from the relation between pressure and the volume of mercury intruded into pores. Mercury is first introduced into large pores and then into smaller pores successively.

Figure 7:
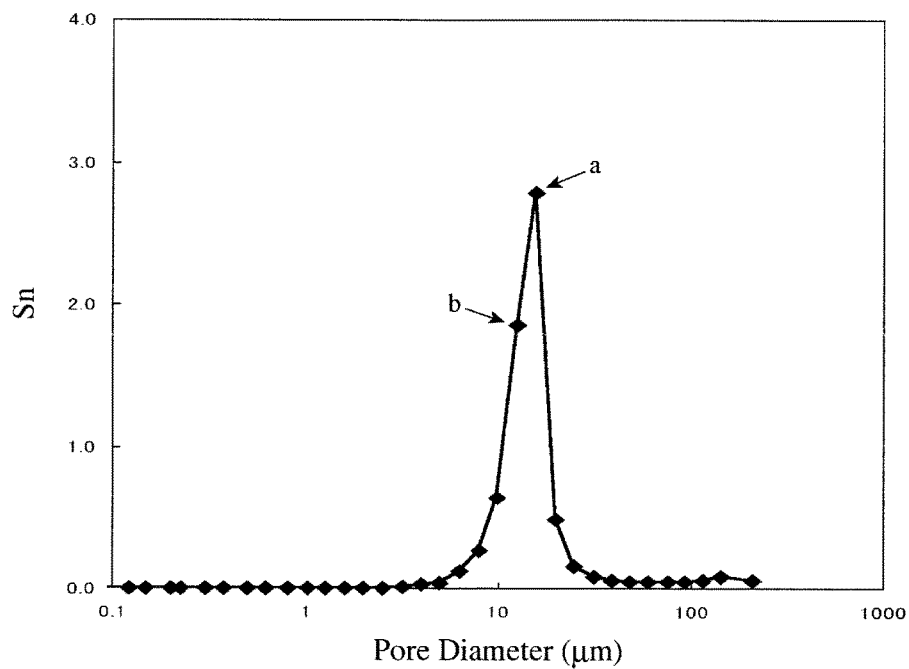
FIG. 7 is a graph in which the inclination $S_n$ determined from the cumulative pore volume curve of FIG. 6 is plotted against the pore diameter.

A measurement example of the inclination $S_n$ is shown in FIGS. 6 and 7. FIG. 6 shows an example of the relations between a pore diameter and a cumulative pore volume measured by mercury porosimetry, in which measurement points are indicated by diamond-shaped points with numbers representing a measurement order. FIG. 7 is a graph, in which the inclination $S_n$ determined from the cumulative pore volume curve in the graph of FIG. 6 at each measurement point is plotted. For example, in FIG. 7, a point a represents an inclination $S_{13}=-[(V_{13}-V_{12})/\{\log(d_{13})-\log(d_{12})\}]$, which is determined from pore diameters $d_{12}$ and $d_{13}$, and cumulative pore volumes $V_{12}$ and $V_{13}$, at the 12-th and 13-th measurement points in the cumulative pore volume curve shown in FIG. 6, and a point b represents an inclination $S_{14}=-[(V_{14}-V_{13})/\{\log(d_{14})-\log(d_{13})\}]$, which is determined from pore diameters $d_{13}$ and $d_{14}$, and cumulative pore volumes $V_{13}$ and $V_{14}$, at the 13th and 14th measurement points.

(d) Thermal Expansion Coefficient

The ceramic honeycomb structure preferably has a thermal expansion coefficient of $13\times10^{-7}/°$ C. or less between 40° C. and 800° C. in a flow path direction. Because the ceramic honeycomb structure having such a thermal expansion coefficient has high heat shock resistance, it can be sufficiently put into practical use for, for example, a ceramic honeycomb filter for removing particulate matter from exhaust gases discharged from diesel engines. The above thermal expansion coefficient is preferably $3\times10^{-7}$ to $12\times10^{-7}$, more preferably $5\times10^{-7}$ to $11\times10^{-7}$.

(e) Structure of Cell Walls

The ceramic honeycomb structure preferably has an average cell wall thickness of 5-15 mil (0.127-0.381 mm) and an average cell density of 150-400 cpsi (23.3-62.0 cells/cm$^2$). With such a cell wall structure, it can carry an increased amount of a catalytic material, resulting in improved contact efficiency of the catalytic material with an exhaust gas, and improved pressure loss characteristics. The average cell wall thickness of less than 5 mil provides the cell walls with low strength, while the average cell wall thickness of more than 15 mil cannot provide low pressure loss. The average cell density of less than 150 cpsi provides the cell walls with low strength, while the average cell density of more than 300 cpsi cannot provide low pressure loss. Preferable are 6-12 mil (0.152-0.305 mm) and 200-400 cpsi (31.0-62.0 cells/cm$^2$). The cross section shape of each cell when viewed in a flow path direction may be polygonal such as square, hexagonal, etc., circular, elliptical, etc., and may be asymmetric with different sizes between the inlet and the outlet.

Figure 8:
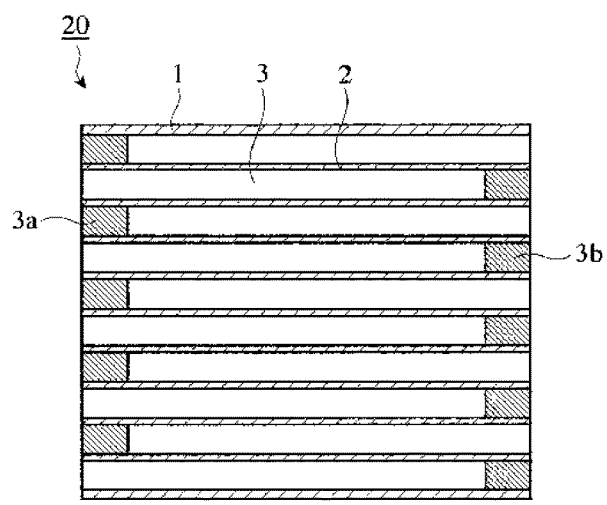
FIG. 8 is a longitudinal cross-sectional view schematically showing an example of ceramic honeycomb filters.

The ceramic honeycomb structure may be used not only as a carrier of an SCR catalyst, an object of the present invention, but also as a carrier of an exhaust-gas-cleaning catalyst such as an oxidation catalyst. With the ends 3a, 3b of desired flow paths 3 alternately plugged by a known method as shown in FIG. 8, it can be formed into a ceramic honeycomb filter 20, which can carry an exhaust-gas-cleaning catalyst. The ceramic honeycomb structure of the present invention is usable for removing harmful substance from exhaust gases of diesel engines, gasoline engines, etc.

(f) Material of Cell Walls

Materials for the cell walls are preferably cordierite, aluminum titanate, silicon carbide, silicon nitride, etc., which have excellent heat resistance, because the ceramic honeycomb structure is used for a carrier or a filter for cleaning an exhaust gas discharged from internal engines such as diesel engines, gasoline engines, etc. Preferable among them are those having low-thermal-expansion cordierite having excellent heat shock resistance as a main crystal. When the main crystal phase is cordierite, other crystal phases such as spinel, mullite, sapphirine, etc. may be contained, and glass components may also be contained.

[2] Production Method of Ceramic Honeycomb Structure

The production method of the ceramic honeycomb structure of the present invention comprises the steps of extruding a moldable material comprising a ceramic material and a pore-forming material (hollow resin particles coated with inorganic powder) to form a predetermined green body, and drying and sintering the green body;

the moldable material comprising 4% or more and less than 8% by mass of the pore-forming material per 100% by mass of the ceramic material;

the pore-forming material having a median diameter D50 of 25-35 μm, D10 of 14-24 μm, wherein D10 is a particle diameter at a cumulative volume corresponding to 10% of the total volume, D90 of 45-60 μm, wherein D90 is a particle diameter at a cumulative volume corresponding to 90% of the total volume, and a particle diameter distribution deviation SD [=log (D80)−log(D20)] of 0.4 or less, wherein D20 represents a particle diameter at a cumulative volume corresponding to 20% of the total volume, D80 represents a particle diameter at a cumulative volume corresponding to 80% of the total volume, and D20<D80, in a curve of a cumulative volume (cumulative volume of particles up to a particular diameter) to a particle diameter; and the pore-forming material having the maximum compression recovery Lmax of 3.0 mm or more, and a compression recovery L in a compression stress range of 2-6 MPa, which is 80% or more of the maximum compression recovery Lmax.

The compression recovery L is defined by the returning distance (mm) of a piston having an outer diameter of 8 mm applying a predetermined compression stress to 0.3 g of a pore-forming material in a metal cylinder having an inner diameter of 8 mm and a depth of 100 mm, when the pore-forming material is relieved of the compression stress.

The maximum compression recovery Lmax is the maximum of the compression recovery L.

When the ceramic material and the inorganic powder (covering the pore-forming material) constitute a cordierite-forming material, the ceramic material and the inorganic powder comprise 15-25% by mass of silica, 27-43% by mass of talc, and 15-30% by mass of alumina, per 100% by mass of their total amount. Silica preferably has a median diameter D50 of 15-30 μm, the percentage of particles having diameters of 10 μm or less being 3% or less by mass, the percentage of particles having diameters of 100 μm or more being 3% or less by mass, and the particle diameter distribution deviation SD being 0.4 or less. Talc preferably has a median diameter D50 of 1-10 μm, and a particle diameter distribution deviation SD of 0.6 or less. Alumina preferably has a median diameter D50 of 1-8 μm, and a particle diameter D90 of 5-15 μm at a cumulative volume corresponding to 90% of the total volume, in a curve of a cumulative volume to a particle diameter.

Such method can produce the ceramic honeycomb structure of the present invention having
  (a) porosity of 55% or more and less than 65%, and
  (b) 35,000/mm$^3$ or more of substrate branches, wherein the number of substrate branches is defined by the number of branch points (including connecting points of 3 or more branches and connecting points of different-width branches) per a unit volume, in a network structure obtained by the skeletonization of the three-dimensional structure of cell wall substrates determined by X-ray CT.

Pores formed in the ceramic include pores formed by the melting of the ceramic material and pores formed by burning off the pore-forming material, in the sintering process. Accordingly, pores formed by the sintering the ceramic material can be controlled by adjusting the median diameters and particle diameter distributions of the ceramic material and the pore-forming material, thereby controlling the three-dimensional structure of the substrates.

When a green body comprising a ceramic material and a pore-forming material is sintered, the pore-forming material being hollow resin particles coated with inorganic powder, which have the maximum compression recovery Lmax of 3.0 mm or more, and compression recovery L in a compression stress range of 2-6 MPa corresponding to 80% or more of the maximum compression recovery Lmax, the resin particles are burned off to leave voids, and the ceramic material and the inorganic powder on surfaces of the resin particles are sintered, resulting in pores having a desired pore distribution. In this process, the inorganic powder on the resin particles is sintered together with the surrounding ceramic material, resulting in improved communication of pores from the cell wall surfaces to the inside, and large numbers of substrate branches. Also, by using hollow resin particles generating less heat than solid resin particles when burned, cracking unlikely occurs in the sintering process of the green body. The compression recovery L is defined by the returning distance (mm) of a piston having an outer diameter of 8 mm applying a predetermined compression stress to 0.3 g of a pore-forming material in a metal cylinder having an inner diameter of 8 mm and a depth of 100 mm, when the pore-forming material is relieved of the compression stress. The maximum compression recovery Lmax is the maximum of the compression recovery L.

Because pores formed by the sintering of the ceramic material and the inorganic powder coated on the resin particles, and pores formed by the pore-forming material have good communication with each other, with a desired number of substrate branches, a catalyst can be carried on the branched substrate surfaces efficiently, resulting in high contact efficiency of an exhaust gas with the catalytic material, and an increased amount of the catalytic material carried, thereby providing a ceramic honeycomb structure with improved pressure loss characteristics and strength.

(1) Pore-forming Material (a) Structure

The pore-forming material is preferably constituted by hollow resin particles coated with inorganic powder. The inorganic powder is preferably attached to the surfaces of hollow resin particles.

The amount of the pore-forming material added is preferably 4% or more and less than 8% by mass, per 100% by mass of the ceramic material. Outside this amount range of the pore-forming material, it is difficult to obtain cell walls having the above porosity and substrate structure (the number of substrate branches). When the amount of the pore-forming material added is less than 4% by mass, it is difficult to provide the cell walls with porosity of 55% or more, resulting in a reduced amount of a catalytic material carried, and thus poorer pressure loss characteristics. When the amount of the pore-forming material added is 8% or more by mass, the cell walls may have porosity of 65% or more, resulting in insufficient strength. The amount of the pore-forming material added is preferably 5% or more by mass, more preferably 6% or more by mass.

The pore-forming material particles (including inorganic powder) preferably have a median diameter D50 of 25-35 μm. The median diameter D50 of less than 25 μm provides poor pressure loss characteristics. When the median diameter D50 is more than 35 μm, large pores are formed, resulting in smaller substrate diameters, and thus lower strength. The median diameter D50 of the pore-forming material particles is preferably 27-33 μm, more preferably 28-32 μm.

The pore-forming material particles preferably have a particle diameter D10 (at a cumulative volume corresponding to 10% of the total volume) of 14-24 μm, a particle diameter D90 (at a cumulative volume corresponding to 90% of the total volume) of 45-60 μm, and a particle diameter distribution deviation SD of 0.4 or less, in a curve expressing the relation of a particle diameter to a cumulative volume (cumulative volume of particles in a particle diameter range equal to or less than a particular level). The particle diameters of the pore-forming material can be measured, for example, by a particle diameter distribution meter (Microtrack MT3000 available from Nikkiso Co., Ltd.). The particle diameter D10 is preferably 15-23 μm, the D90 is preferably 47-58 μm, and the particle diameter distribution deviation SD is preferably 0.35 or less, more preferably 0.3 or less.

The particle diameter distribution deviation SD is expressed by SD=log(D80)−log(D20), wherein D20 is a particle diameter at a cumulative volume corresponding to 20% of the total volume, and D80 is a particle diameter at a cumulative volume corresponding to 80% of the total volume, in a curve of a cumulative volume to a particle diameter. D20<D80.

As described later, the pore-forming material is constituted by hollow resin particles containing a gas such as a hydrocarbon gas, etc., which are deformed by pressure or shearing because of the hollow structure, so that resin shells may be broken, failing to keep their shapes. Because the moldable material is extruded, for example, at pressure of 5 MPa or more, it is considered that hollow resin particles constituting the pore-forming material are deformed by compression during extrusion, resulting in partial breakage. Though the pore-forming material deformed by compression recovers its original shape when returned to natural pressure after extrusion (springback phenomenon), keeping its function, the broken pore-forming material cannot exhibit its own function. Accordingly, the pore-forming material should have such property that it is deformed without breakage under extrusion pressure or higher, and recovers its original shape when the pressure is relieved (compression recoverability).

Figure 9:
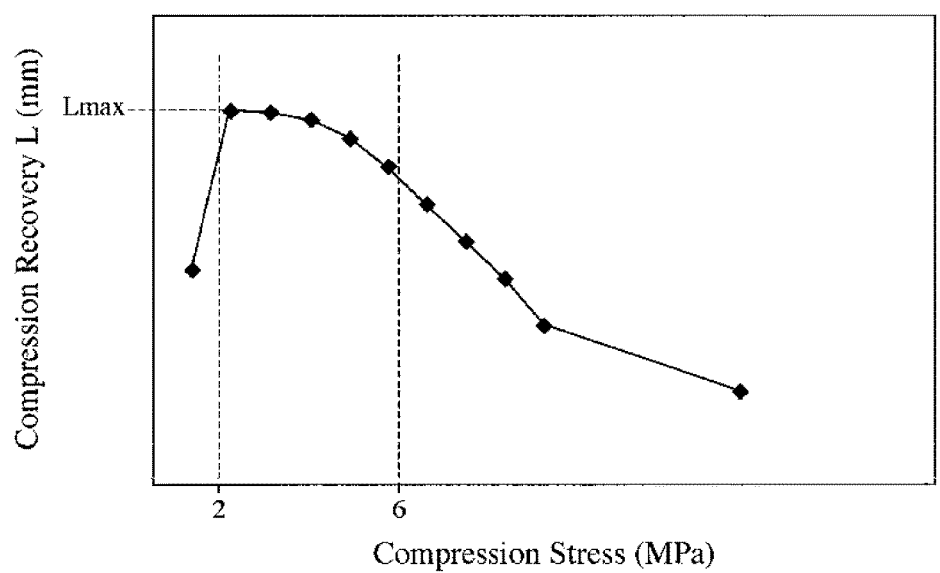
FIG. 9 is a graph showing an example of the measurement results of a compression recovery test of a pore-forming material.

The compression recoverability of the pore-forming material is evaluated by measuring the compression recovery L by a compression recovery test described below. The compression recovery test is conducted by introducing 0.3 g of a pore-forming material into a metal cylinder having an inner diameter of 8 mm and a depth of 100 mm, applying a predetermined compression stress to the pore-forming material by a piston having an outer diameter of 8 mm (mass: 96.45 g), and measuring the distance (mm) of the piston returning from the compressed state after removing the compression stress, which is defined as a compression recovery L. When the compression recovery L is measured with varied compression stress, an upward bulging curve is obtained as shown in FIG. 9. The maximum of the compression recovery L in a measured range is the maximum compression recovery Lmax. The compression recoverability is evaluated by (a) the maximum compression recovery Lmax, and (b) a ratio L/Lmax of the compression recovery L in a compression stress range of 2-6 MPa to the maximum compression recovery Lmax.

The pore-forming material has the maximum compression recovery Lmax of 3.0 mm or more, and compression recovery L in a compression stress range of 2-6 MPa, which is 80% or more of the maximum compression recovery Lmax (L/Lmax≥80%). Namely, the minimum of the compression recovery L in a compression stress range of 2-6 MPa is preferably 80% or more of the maximum compression recovery Lmax. In the pore-forming material having such compression recoverability, only few particles are broken by extrusion compression, so that a function as a pore-forming material can be sufficiently kept.

The pore-forming material particles preferably have sphericity of 0.5 or more. When the sphericity of the pore-forming material particles is less than 0.5, the cell walls undesirably have many pores with sharp corners, which likely act as the starting points of breakage, likely providing the honeycomb structure with low strength. The sphericity of the pore-forming material particles is preferably 0.7 or more, more preferably 0.8 or more. The sphericity of the pore-forming material particles is determined by dividing a projected area of the pore-forming material particle by the area of a circle having a diameter corresponding to the longest straight line connecting two points on a periphery of the pore-forming material particle through its center of gravity, and can be measured on an electron photomicrograph by an image analyzer.

(b) Resin Particles

The hollow resin particles are preferably foamed resin particles, particularly balloon-shaped, foamed resin particles. Resins for the pore-forming material particles are suitably polymethylmethacrylate, polybutylmethacrylate, polyacrylates, polystyrenes, polyethylene, polyethylene terephthalate, methylmethacrylate/acrylonitrile copolymers, etc. The hollow resin particles preferably have a shell thickness of 0.1-3 μm, containing a gas such as hydrocarbons, etc. in the shell.

(c) Inorganic Powder

The inorganic powder is preferably at least one selected from the group consisting of kaolin, silica, talc, cordierite, alumina, aluminum hydroxide, calcium carbonate and titanium oxide. The inorganic powder is more preferably kaolin, silica, talc, cordierite, alumina and aluminum hydroxide, and most preferably talc.

To form well communicating pores by the sintering of the ceramic material and the inorganic powder, the median diameter D50i of the inorganic powder is preferably 0.5-15 μm, more preferably 0.6-12 μm, most preferably 0.6-10 μm.

A ratio D50i/D50 of the median diameter D50i of the inorganic powder to the median diameter D50 of the pore-forming material is preferably 0.5 or less. With D50i/D50 within such range, the inorganic powder can be well attached to the resin particles. Because the inorganic powder with D50i/D50 of more than 0.5 is not well attached to the resin particles, the use of such inorganic powder fails to provide good communication of pores formed by the sintering of the ceramic material with pores formed by the resin particles, making it difficult to obtain a desired number of substrate branches. The D50i/D50 is preferably 0.01-0.45.

(2) Ceramic Material

The composition of the ceramic material is preferably adjusted to form a cordierite-forming material together with the inorganic powder covering the pore-forming material. The cordierite-forming material is obtained by mixing a silica source powder, an alumina source powder and a magnesia source powder such that its main crystal is cordierite having a chemical composition comprising 42-56% by mass of $SiO_2$, 30-45% by mass of $Al_2O_3$ and 12-16% by mass of MgO as main components. The ceramic material and the inorganic powder preferably constitutes a cordierite-forming material comprising 15-25% by mass of silica, 27-43% by mass of talc and 15-30% by mass of alumina, per 100% by mass in total of the ceramic material and the inorganic powder (cordierite-footing material). Pores in a ceramic whose main crystal is cordierite include pores formed by melting the ceramic material in the sintering process, and pores fruited by burning off the pore-forming material. Accordingly, by adjusting the particle diameter and particle diameter distribution of the above pore-forming material, and ceramic materials such as kaolin, silica, talc, alumina, etc., pores generated by sintering the cordierite-type ceramic and the substrate structure can be controlled. Among them, silica diffusion-reacted with the surrounding material forms pores, having large contribution to the substrate structure (pore structure) together with the pore-forming material.

(a) Silica

It is known that silica is more stable than other materials at high temperatures, and melted and diffused at 1300° C. or higher to form pores. Accordingly, the cordierite-forming material containing 15-25% by mass of silica provides a desired amount of pores. When more than 25% by mass of silica is contained, the amounts of kaolin and/or talc, other silica sources, should be reduced to keep cordierite as a main crystal, so that the effect of kaolin of reducing thermal expansion, which is obtained by the orientation of kaolin during extrusion is deteriorated, resulting in low heat shock resistance. On the other hand, when silica is less than 15% by mass, the desired porosity may not be obtained, resulting in poor pressure loss characteristics. When the pore-forming material comprising silica as inorganic powder is used, the amount of silica added to the cordierite-forming material is properly changed, taking into account the amount of silica in the pore-forming material.

Silica preferably has a median diameter D50 of 15-30 µm, the percentage of particles having diameters of 10 µm or less being 3% or less by mass, the percentage of particles having diameters of 100 µm or more being 3% or less by mass, and its particle diameter distribution deviation SD being 0.4 or less. The use of silica particles having such particle diameters and particle diameter distribution in combination with the pore-forming material can increase the number of substrate branches.

Silica having a median diameter D50 of less than 15 µm provides large substrate diameters, likely resulting in increased pressure loss. On the other hand, silica having a median diameter D50 of more than 30 µm provides small substrate diameters, likely resulting in low strength. The median diameter D50 of silica is preferably 17-28 µm, more preferably 19-26 µm.

The inclusion of more than 3% by mass of silica particles having diameters of 10 µm or less provides a large substrate diameter, likely resulting in increased pressure loss. Accordingly, the percentage of silica particles having diameters of 10 µm or less is preferably 2% or less by mass. The inclusion of more than 3% by mass of particles having diameters of 10 µm or more provides a small substrate diameter, likely resulting in low strength. The percentage of silica particles having diameters of 100 µm or more is preferably 2% or less by mass. The particle diameter distribution deviation SD of silica is preferably 0.35 or less, more preferably 0.3 or less.

The sphericity of silica particles is preferably 0.5 or more. When the sphericity of silica particles is less than 0.5, the cell walls undesirably have many pores having sharp corners easily acting as the starting sites of breakage, likely lowering the strength of the honeycomb structure. The sphericity of silica particles is preferably 0.6 or more, more preferably 0.7 or more. The sphericity of each silica particle is determined by dividing a projected area of the silica particle by the area of a circle having a diameter corresponding to the longest straight line connecting two points on a periphery of the silica particle through its center of gravity, and can be measured on an electron photomicrograph by an image analyzer.

The silica particles may be crystalline or amorphous, and amorphous silica particles are preferable to adjust the particle diameter distribution. Amorphous silica is produced by pulverizing an ingot obtained by melting high-purity natural quartz at a high temperature. Silica particles may contain $Na_2O$, $K_2O$, and CaO as impurities, but the total amount of the impurities is preferably 0.1% or less to prevent increase in a thermal expansion coefficient.

Silica particles having high sphericity are obtained by spraying finely pulverized high-purity natural silica into a high-temperature flame. Sprayed into a high-temperature flame, silica particles are melted to a spherical shape, resulting in amorphous silica having high sphericity. The diameters of spherical silica particles are preferably adjusted by such a method as classification, etc.

(b) Kaolin

As a silica component used for the cordierite-forming material, kaolin powder may be added in addition to silica powder. The kaolin powder is preferably 1-15% by mass. With more than 15% by mass of the kaolin powder, the amounts of silica and/or talc, other silica sources, should be reduced to form cordierite as a main crystal, likely failing to obtain a desired substrate structure. With less than 1% by mass of the kaolin powder, the ceramic honeycomb structure has a large thermal expansion coefficient. The amount of the kaolin powder is more preferably 4-8% by mass.

When kaolin particles are oriented such that their c-axes are perpendicular to the longitudinal direction of the extrusion-molded honeycomb structure, the c-axes of cordierite crystals are in parallel to the longitudinal direction of the honeycomb structure, providing the honeycomb structure with a small thermal expansion coefficient. The shape of kaolin particles has large influence on the orientation of kaolin particles. The cleavage index of kaolin particles, an index indicating the shape of kaolin particles quantitatively, is preferably 0.80 or more, more preferably 0.85 or more. The cleavage index of kaolin particles can be determined by the formula of cleavage index=$I_{(002)}/[I_{(200)}+I_{(020)}+I_{(002)}]$, wherein $I_{(200)}$, $I_{(020)}$ and $I_{(002)}$ respectively represent the X-ray diffraction peak intensities of (200), (020) and (002) planes of the press-molded kaolin particles. The larger the cleavage index, the more the kaolin particles are oriented.

(c) Talc

The cordierite-forming material preferably comprises 27-43% by mass of talc having a median diameter D50 of 1-10 µm and a particle diameter distribution deviation SD of 0.6 or less, based on 100% by mass of the cordierite-forming material. Talc, a compound composed of MgO and $SiO_2$, is reacted with nearby $Al_2O_3$ and melted in the sintering process, thereby forming pores. Accordingly, with talc having small particle diameters mixed with an $Al_2O_3$ source, the number of substrate branches can be increased, resulting in improved communication of pores in the cell walls. The inclusion of talc having a median pore diameter D50 of less than 1 µm provides low communication of pores, resulting in low pressure loss characteristics. On the other hand, the inclusion of talc having a median pore diameter D50 of more than 10 µm forms many large pores. The median pore diameter D50 of talc is preferably 2-9 µm, more preferably 3-8 µm. The particle diameter distribution deviation SD of talc particles is preferably 0.55 or less, more preferably 0.5 or less.

To reduce the thermal expansion coefficient of a ceramic honeycomb structure having a cordierite-type crystal phase, talc is preferably in a planar particle shape. The morphology index of talc particles indicating their flatness is preferably 0.5 or more, more preferably 0.6 or more, most preferably 0.7 or more. The morphology index is, as described in U.S. Pat. No. 5,141,686, determined by the formula of morphology index=$Ix/(Ix+2Iy)$, wherein $Ix$ and $Iy$ respectively represent the diffraction intensities of (004) and (020) planes of talc, which are obtained by the X-ray diffraction measurement of planar talc particles. The larger the morphology index, the higher the flatness of talc particles.

Talc may contain as impurities $Fe_2O_3$, CaO, $Na_2O$, $K_2O$, etc. The amount of $Fe_2O_3$ is preferably 0.5-2.5% by mass in the magnesia source to obtain the desired particle size distribution. The total amount of $Na_2O$, $K_2O$ and CaO is preferably 0.50% or less by mass to have a low thermal expansion coefficient.

The amount of talc in the cordierite-forming material is preferably 27-43% by mass, so that cordierite constitutes a main crystal. In the case of using a pore-forming material constituted by hollow resin particles coated with talc as the inorganic powder, the amount of talc added to the cordierite-forming material is properly adjusted, taking into account the amount of talc contained in the pore-forming material.

(d) Alumina

The cordierite-forming material preferably contains 15-30% by mass of alumina based on 100% by mass thereof. Alumina preferably has a median pore diameter D50 of 1-8 µm, and a particle diameter D90 of 5-15 µm at a cumulative volume corresponding to 90% of the total volume, in the curve of a cumulative volume to a particle diameter. The median diameter D50 of alumina is preferably 2-7 μm, more preferably 3-6 μm. As the alumina component, aluminum hydroxide may be preferably used, in addition to alumina. The total amount of $Na_2O$, $K_2O$ and CaO as impurities in alumina or aluminum hydroxide is preferably 0.5% or less by mass, more preferably 0.3% or less by mass, most preferably 0.1% or less by mass.

(3) Production Method

The cordierite-type ceramic honeycomb structure is produced by dry-mixing a ceramic material and a pore-forming material with a binder, and if necessary, additives such as a dispersant, a surfactant, etc.; blending the resultant mixture with water to prepare a moldable plastic material, which is extruded from a known honeycomb-molding die to form a honeycomb-shaped green body, by a known extrusion-molding method; drying the green body; machining end and peripheral surfaces, etc. of the green body, if necessary; and then sintering the green body.

Sintering is conducted by controlling heating and cooling speeds in a continuous or batch furnace. The green body is kept at 1350-1450° C. for 1-50 hours to sufficiently form cordierite as a main crystal, and then cooled to room temperature. Particularly when a large cordierite-type ceramic honeycomb structure having an outer diameter of 150 mm or more and a length of 150 mm or more is produced, the temperature-elevating speed is preferably 0.2-10° C./hour in a binder-decomposing temperature range, for example, between 150° C. and 350° C., and 5-20° C./hour in a cordierite-forming temperature range, for example, between 1150° C. and 1400° C., thereby preventing cracking in the green body in the sintering process. The cooling is preferably conducted at a speed of 20-40° C./hour in a temperature range of 1400° C. to 1300° C.

Apart from being used as a carrier for an SCR catalyst, which is an object of the present invention, the resultant honeycomb structure can be alternately plugged in end portions 3a, 3b of desired flow paths 3 by a known method as shown in FIG. 8 to provide a ceramic honeycomb filter 20. The plugging may be conducted before or after sintering the ceramic honeycomb structure.

The present invention will be explained in more detail referring to Examples below, without intention of restricting the present invention thereto.

EXAMPLES 1 and 2, and COMPARATIVE EXAMPLES 1 and 2

Silica powder, talc powder, alumina powder, aluminum hydroxide powder and kaolin powder each having the characteristics (particle diameter, particle diameter distribution, etc.) shown in Tables 1-6 were mixed in the formulation shown in Table 7, the total amount of a ceramic material (including inorganic powder covering the pore-forming material) being 100 parts by mass, to obtain a cordierite-forming material powder having a chemical composition providing cordierite by sintering.

After mixing each cordierite-forming material powder with pore-forming material particles shown in Table 6 in the amount shown in Table 7, and with methylcellulose, it was blended with water to prepare a moldable plastic ceramic material of a cordierite-forming material. The pore-forming material A was hollow resin particles containing a butane gas and coated with talc, and the pore-forming material B was hollow resin particles containing a butane gas without coating. The sphericity of pore-forming material particles was calculated by the formula of A1/A2, wherein A1 represents a projected area of each particle determined by an image analyzer on an electron photomicrograph, and A2 represents the area of a circle whose diameter is the longest straight line passing through the center of gravity and two peripheral points of each particle, and averaged on 20 particles.

TABLE 1

| Silica | D50[1] (μm) | Percentage (%) of Particles ≤10 μm | Percentage (%) of Particles ≥100 μm | SD[2] |
|---|---|---|---|---|
| A | 25.2 | 1.9 | 1.1 | 0.30 |
| B | 40.0 | 2.5 | 8.8 | 0.45 |

| Silica | Sphericity | CaO (% by mass) | $Na_2O$ (% by mass) | $K_2O$ (% by mass) |
|---|---|---|---|---|
| A | 0.85 | 0.001 | 0.0019 | 0.0025 |
| B | 0.41 | 0.001 | 0.0025 | 0.0022 |

Note:
[1]D50 represents a median diameter.
[2]SD represents a particle diameter distribution deviation.

TABLE 2

| Talc | D50[1] (μm) | SD[2] | Morphology Index |
|---|---|---|---|
| A | 7.1 | 0.51 | 0.86 |
| B | 13 | 0.66 | 0.40 |

| Talc | CaO (% by mass) | $Na_2O$ (% by mass) | $K_2O$ (% by mass) | $Fe_2O_3$ (% by mass) |
|---|---|---|---|---|
| A | 0.11 | 0.001 | 0.001 | 1.0 |
| B | 0.16 | 0.001 | 0.001 | 1.3 |

Note:
[1]D50 represents a median diameter.
[2]SD represents a particle diameter distribution deviation.

TABLE 3

| Alumina | D50[1] (μm) | D90 (μm) | CaO (% by mass) | $Na_2O$ (% by mass) | $K_2O$ (% by mass) |
|---|---|---|---|---|---|
| A | 4.5 | 8.6 | 0.001 | 0.15 | 0.001 |
| B | 8 | 19 | 0.001 | 0.18 | 0.001 |

Note:
[1]D50 represents a median diameter.

TABLE 4

| Aluminum Hydroxide | D50[1] (μm) | CaO (% by mass) | $Na_2O$ (% by mass) | $K_2O$ (% by mass) |
|---|---|---|---|---|
| A | 11 | 0.001 | 0.04 | 0.001 |
| B | 12 | 0.001 | 0.06 | 0.001 |

Note:
[1]D50 represents a median diameter.

TABLE 5

| Kaolin | D50[1] (μm) | Cleavage Index | CaO (% by mass) | $Na_2O$ (% by mass) | $K_2O$ (% by mass) |
|---|---|---|---|---|---|
| A | 5.5 | 0.90 | 0.11 | 0.02 | 0.07 |
| B | 5.0 | 0.80 | 0.15 | 0.03 | 0.08 |

Note:
[1]D50 represents a median diameter.

TABLE 6

| Pore-Forming Material | Type | D50[1] (μm) | D10 (μm) | D20 (μm) | D80 (μm) | D90 (μm) | SD[2] |
|---|---|---|---|---|---|---|---|
| A | Talc-Coated Hollow Resin | 31.2 | 18.1 | 23.4 | 43.0 | 55.4 | 0.26 |
| B | Hollow Resin | 43 | 25 | 24.0 | 67.5 | 67 | 0.45 |

Note:
[1]D50 represents a median diameter.
[2]SD represents a particle diameter distribution deviation.

| Pore Forming Material | Sphericity | True Specific Gravity | Lmax[1] (mm) | L/Lmax[2] (%) |
|---|---|---|---|---|
| A | 0.92 | 0.23 | 4.3 | 91 |
| B | 0.92 | 0.02 | 2.4 | 75 |

Note:
[1]Lmax represents the maximum compression recovery.
[2]A ratio of the compression recovery L to the maximum compression recovery Lmax.

| | | Inorganic Powder Coated on Pore-Forming Material Surface | | | | |
|---|---|---|---|---|---|---|
| Pore-Forming Material | Type | Amount (% by mass) | D50i[1] (μm) | CaO (% by mass) | $Na_2O$ (% by mass) | $K_2O$ (% by mass) |
| A | Talc | 80 | 2.0 | 0.08 | 0.001 | 0.001 |
| B | No | — | — | — | — | — |

Note:
[1]D50i represents a median diameter.

The particle diameter distributions [median diameters D50, D90 and D10 (percentages of particles having diameters of 10 μm or less and 100 μm or more), etc.] of silica powder, talc powder, alumina powder, aluminum hydroxide powder, kaolin powder, and the pore-forming material were measured by a particle diameter distribution meter (Microtrack MT3000 available from Nikkiso Co., Ltd.).

TABLE 7

| | Silica | | Talc | | Alumina | |
|---|---|---|---|---|---|---|
| No. | Type | Amount[1] | Type | Amount[1] | Type | Amount[1] |
| Example 1 | A | 18.0 | A | 34.8 | A | 20.0 |
| Example 2 | A | 18.0 | A | 34.8 | A | 20.0 |
| Com. Ex. 1 | A | 18.0 | A | 30.7 | A | 20.0 |
| Com. Ex. 2 | B | 18.1 | B | 41.2 | B | 23.3 |

Note:
[1]The unit is parts by mass.

| | Aluminum Hydroxide | | Kaolin | | Pore-Forming Material | |
|---|---|---|---|---|---|---|
| No. | Type | Amount[1] | Type | Amount[1] | Type | Amount[1] |
| Example 1 | A | 15.0 | A | 6.2 | A | 7.5[2] |
| Example 2 | A | 15.0 | A | 6.2 | A | 7.5[2] |
| Com. Ex. 1 | A | 15.0 | A | 6.2 | A | 12.6[3] |
| Com. Ex. 2 | B | 11.3 | B | 6.0 | B | 6.0 |

Note:
[1]The unit is parts by mass.
[2]Including 1.5 parts by mass of resin + 6.0 parts by mass of coated talc.
[3]Including 2.5 parts by mass of resin + 10.1 parts by mass of coated talc.

Each moldable material was extruded to form a honeycomb-shaped green body, dried, machined to remove its peripheral portion, and then sintered according to a 209-hour schedule comprising temperature elevation at an average speed of 10° C./hour between room temperature and 150° C., 2° C./hour between 150° C. and 350° C., 20° C./hour between 350° C. and 1150° C., and 15° C./hour between 1150° C. and 1410° C., keeping the highest temperature of 1410° C. for 24 hours, and cooling at an average speed of 30° C./hour between 1400° C. and 1300° C., and 80° C./hour between 1300° C. and 100° C., in a sintering furnace. The sintered ceramic honeycomb body was coated with a skin material comprising amorphous silica and colloidal silica on the outer peripheral surface, and dried to provide two cordierite-type ceramic honeycomb structures each having an outer diameter of 266.7 mm, a length of 304.8 mm, and the cell wall thickness and cell density shown in Table 8 in each of Examples 1 and 2 and Comparative Examples 1 and 2. In Examples 1 and 2, ceramic honeycomb structures having different cell wall thicknesses and cell densities were formed by extruding a moldable material having the same composition through different dies.

With respect to one of the cordierite-type ceramic honeycomb structures in each of Examples and Comparative Examples, the measurement of pore distributions by mercury porosimetry, the measurement of substrate structures by X-ray CT, the measurement of A-axis compression strength, and the measurement of thermal expansion coefficients were conducted by the following methods. These results are shown in Table 8. In Example 2, a moldable material having the same composition as in Example 1 was molded, and sintered under the same sintering conditions as in Example 1. It is thus considered that the substrate structure of Example 2 was the same as that of Example 1. Accordingly, the measurement of the substrate structure [the measurement of the number of substrate branches by X-ray CT, and the measurement of d10, d50, d90 and (d90−d10)/d50] was omitted.

(a) Measurement of Pore Distribution by Mercury Porosimetry

The pore volume, the porosity, and the inclination Sn of a cumulative pore volume curve were determined from the measurement results of mercury porosimetry. According to mercury porosimetry, a test piece (10 mm×10 mm×10 mm) cut out of each cordierite-type ceramic honeycomb structure was set in a measurement cell of Autopore III available from Micromeritics, the cell was evacuated, and mercury was then introduced into the cell under pressure to determine the relation between the pressure and the volume of mercury intruded into pores in the test piece. A pore diameter converted from the pressure was cumulated from a smaller pore diameter to a larger pore diameter to obtain a cumulative pore volume (corresponding to the volume of mercury), which was plotted against the pore diameter, thereby obtaining a graph showing the relation between the pore diameter and the cumulative pore volume. The mercury-intruding pressure was 0.5 psi ($0.35 \times 10^{-3}$ kg/mm$^2$), and constants used for calculating the pore diameter from the pressure were a contact angle of 130°, and a surface tension of 484 dyne/cm.

Calculated from the mercury porosimetry measurement results were a total pore volume, porosity, and the maximum of the inclination $S_n$ of a curve of a cumulative pore volume to a pore diameter (logarithm). The porosity was calculated from the measured total pore volume, using 2.52 g/cm$^3$ as the true density of cordierite. The results are shown in Table 8.

The inclination $S_n$ of the cumulative pore volume curve was determined from a curve of a cumulative pore volume to a pore diameter. The inclination $S_n$ of the cumulative pore volume curve at an n-th measurement point can be determined from a pore diameter $d_{n-1}$ (µm) and a cumulative pore volume $V_{n-1}$ (cm$^3$/g) at a (n−1)-th measurement point from the start of measurement, and a pore diameter $d_n$ (µm) and a cumulative pore volume $V_n$ (cm$^3$/g) at an n-th measurement point, by the formula of $S_n = -(V_n - V_{n-1})/[\log(d_n) - \log(d_{n-1})]$. The maximum of $S_n$ was selected from the measured values of $S_n$. FIGS. 6 and 7 show an example of measuring the ceramic honeycomb structure of Example 2.

(b) X-Ray CT

The X-ray CT was conducted on a test piece (1.0 mm×2.0 mm×cell wall thickness) cut out of the cell walls of the honeycomb structure under the following conditions.

Measurement Conditions

| Apparatus used | 3D X-ray microscopic CT scanner (MicroXCT 200 of Xradia), |
|---|---|
| Tube voltage | 30 kV, |
| Tube current | 133 µA, |
| Number of pixels | 1024 × 1024 pixels, |
| Resolution | 2.0 µm/pixel, and |
| Analyzed region | 0.52 mm × 0.8 mm × cell wall thickness. |

The data of the three-dimensional structure of the substrates obtained by treating the resultant continuous cross section images (sliced images) with a quantitative analysis software TRI/3D-BON (Ratoc System Engineering Co., Ltd.) were subjected to noise removal by a median filter, and then to binarization to determine the three-dimensional structure of the substrates having distinct substrate portions and pore portions. The identified substrate portions were skeletonized by software to determine the network structure of the substrates, which was expressed by lines having branches 1 and connecting points 2 and extending in center portions of the three-dimensional substrates in FIG. 3.

Analysis was conducted in a designated region of the three-dimensional structure. In the network structure of the substrates, connecting points 2a of 3 or more branches and connecting points 2b of different-width branches were defined as the branch points of the substrate, to determine the number of branch points (substrate branches) per a unit substrate volume (1 mm$^3$). The results are shown in Table 8.

With a substrate portion between two adjacent branch points defined as one substrate unit, branch points of all substrate units were measured in the analyzed region, to determine the length (distance between two adjacent branch points), diameter (a half of a sum of short and long diameters in a transverse cross section) and volume of each substrate unit.

Figure 10:
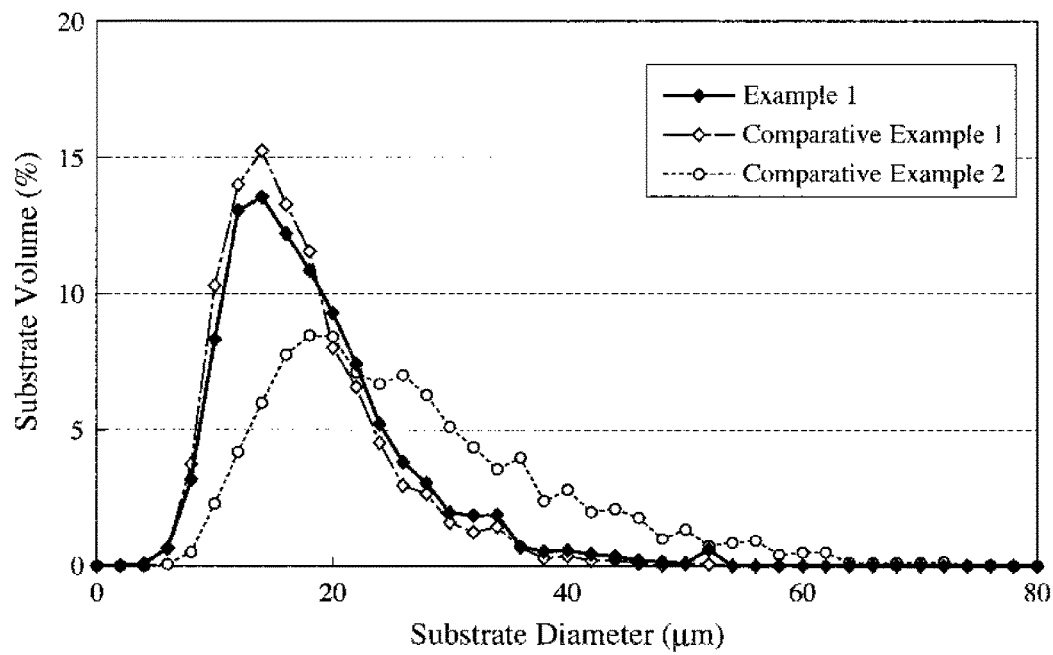
FIG. 10 is a graph showing substrate volume distributions against a substrate unit diameter in Example 1 and Comparative Examples 1 and 2.
Figure 11:
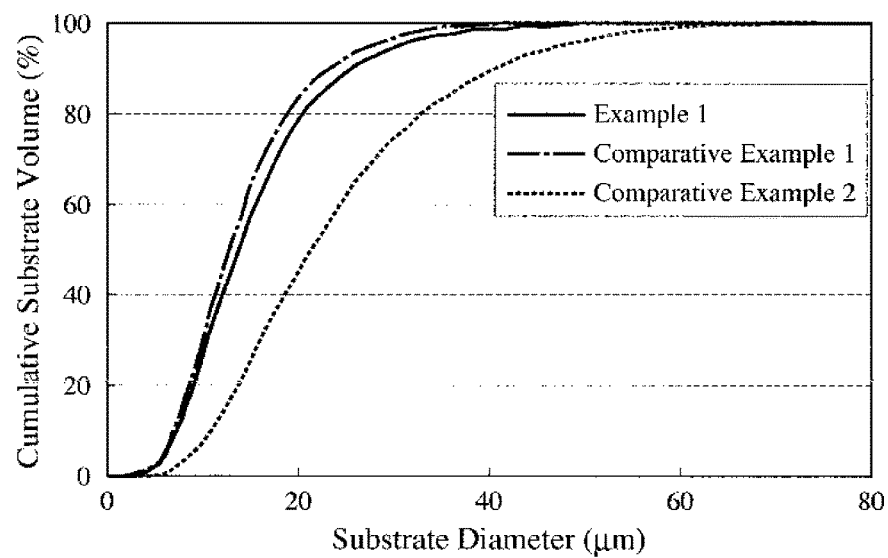
FIG. 11 is a graph showing the relation between a cumulative substrate volume and a substrate unit diameter in Example 1 and Comparative Examples 1 and 2.

Using the data of the diameters and volumes of all substrate units, the substrate volume cumulated by every 2 µm of the substrate diameter was plotted against the substrate diameter, to obtain a substrate volume distribution against a substrate unit diameter. The results are shown in FIG. 10. With a substrate volume cumulated from the minimum substrate diameter (0 µm) to a particular substrate diameter defined as a cumulative substrate volume at the particular substrate diameter in the substrate volume distribution, the relation between the substrate diameter and the cumulative substrate volume was obtained from the substrate volume distribution. The results are shown in FIG. 11.

The substrate diameter d10 at a cumulative substrate volume corresponding to 10% of the total substrate volume, the substrate diameter d50 at a cumulative substrate volume corresponding to 50% of the total substrate volume, and the substrate diameter d90 at a cumulative substrate volume corresponding to 90% of the total substrate volume were determined from the relation between the substrate diameter and the cumulative substrate volume, to calculate the formula of (d90−d10)/d50. The results are shown in Table 8.

(c) Thermal Expansion Coefficient

A test piece having a cross section shape of 4.5 mm×4.5 mm and a length of 50 mm was cut out of the honeycomb structure with its longitudinal direction substantially in alignment with the flow path direction, and heated from room temperature to 800° C. at a temperature-elevating speed of 10° C./minute to measure longitudinal length increase under a constant load of 20 g by a thermomechanical analyzer (TMA, compression load type/differential expansion type, ThermoPlus available from Rigaku Corp.), to determine an average thermal expansion coefficient between 40° C. and 800° C. The results are shown in Table 8.

TABLE 8

| No. | Cell Wall Thickness [mil (mm)] | Cell Density [cpsi (cells/cm$^2$)] | Total Pore Volume (cm$^3$/g) | Porosity (%) | Maximum of $S_n$ |
|---|---|---|---|---|---|
| Example 1 | 8.0 (0.20) | 315 (48.8) | 0.705 | 64 | 2.7 |
| Example 2 | 13.4 (0.34) | 245 (38.0) | 0.687 | 63.4 | 2.8 |
| Com. Ex. 1 | 13.7 (0.35) | 240 (37.2) | 0.995 | 72 | 4.9 |
| Com. Ex. 2 | 12.0 (0.30) | 260 (40.3) | 0.656 | 62.3 | 1.1 |

| No. | Number of Substrate Branches (/mm$^3$) | d10 (µm) | d50 (µm) | d90 (µm) | (d90−d10)/d50 | CTE[1] (×10$^{-7}$/° C.) |
|---|---|---|---|---|---|---|
| Example 1 | 47157 | 9.6 | 15.8 | 27.4 | 1.13 | 12.0 |
| Example 2 | — | — | — | — | — | 12.0 |

TABLE 8-continued

| | | | | | | |
|---|---|---|---|---|---|---|
| Com. Ex. 1 | 41198 | 9.2 | 14.9 | 25.3 | 1.08 | 10.0 |
| Com. Ex. 2 | 20468 | 13.1 | 23.5 | 43.0 | 1.27 | 11.5 |

Note:
[1]CTE represents a thermal expansion coefficient.

(d) A-Axis Compression Strength

The A-axis compression strength was measured according to M505-87, "Test Method of Monolithic Ceramic Carrier for Automobile Exhaust Gas Cleaning Catalyst" of the Society of Automotive Engineers of Japan, and evaluated by the standard described below. The results are shown in Table 9.

A platinum catalyst as an active metal was carried by another cordierite-type ceramic honeycomb structure produced in each of Examples 1 and 2 and Comparative Examples 1 and 2, to produce an SCR catalyst, whose initial pressure loss and NOx-removing ratio were measured by the methods described below. The results are shown in Table 9.

(e) Initial Pressure Loss

The initial pressure loss was measured on a cordierite-type ceramic honeycomb filter fixed to a pressure loss test stand, to which air was supplied at a flow rate of 10 Nm$^3$/min, and expressed by pressure difference between the inlet side and the outlet side (pressure loss). The initial pressure loss was evaluated by the following standards:

Poor: The pressure loss was more than 1.0 kPa,
Fair: It was more than 0.8 kPa and 1.0 kPa or less,
Good: It was more than 0.6 kPa and 0.8 kPa or less, and
Excellent: It was 0.6 kPa or less.

(f) NOx-Removing Ratio

Platinum as an active metal was carried on a ceramic honeycomb structure to produce an SCR catalyst, into which an exhaust gas containing 400 ppm of NOx at 300° C. was introduced to measure the amount of NOx in the exhaust gas at the exit, with urea added in the same amount (calculated as N) as that of NOx in the exhaust gas, thereby determining a NOx-removing ratio. The NOx-removing ratio was evaluated by the following standard:

Good The NOx-removing ratio was more than 80%,
Fair It was 70% or more and less than 80%, and
Poor It was less than 70%.

TABLE 9

| No. | A-Axis Strength (MPa) | Initial Pressure Loss | NOx-Removing Ratio |
|---|---|---|---|
| Example 1 | 2.4 | Good | Good |
| Example 2 | 4.1 | Good | Good |
| Com. Ex. 1 | 1.8 | Good | Good |
| Com. Ex. 2 | 3.5 | Good | Poor |

It is clear from Table 9 that the cordierite-type ceramic honeycomb structures of Examples 1 and 2 (within the present invention) had high strengths, low initial pressure losses and high NOx-removing ratios.

On the other hand, the cordierite-type ceramic honeycomb structure of Comparative Example 1 had high porosity and low strength, because the pore-forming material A was used in a larger amount than in Examples 1 and 2.

The cordierite-type ceramic honeycomb structure of Comparative Example 2 had a small number of substrate branches and an extremely low NOx-removing ratio, because it used as the pore-forming material hollow resin particles not coated with inorganic powder and having a relatively large median diameter, and used silica, talc and alumina having large particle diameters, unlike in Examples 1 and 2.

What is claimed is:

1. A ceramic honeycomb structure comprising porous cell walls defining large numbers of flow paths, said porous cell walls having
   (a) porosity of 55% or more and less than 65%, and
   (b) 35,000/mm$^3$ or more of substrate branches, wherein the number of said substrate branches is defined by the number of branch points per a unit volume, in a network structure obtained by the skeletonization of the three-dimensional structure of said cell wall substrates determined by X-ray CT, wherein the branch points comprise connecting points of 3 or more branches and connecting points of different-width branches.

2. The ceramic honeycomb structure according to claim 1, wherein the three-dimensional structure of said cell wall substrates determined by X-ray CT meets the formula of $(d90-d10)/d50 \leq 1.25$, wherein
   d10, d50 and d90 are substrate diameters at cumulative substrate volumes corresponding to 10%, 50% and 90% of the total substrate volume, in a substrate volume distribution against the diameter of said substrate unit;
   one substrate unit is a substrate portion between two adjacent branch points, which has the substrate diameter and the substrate volume;
   said substrate diameter is determined by halving a sum of short and long diameters of said substrate unit in its transverse cross section;
   and
   said cumulative substrate volume is determined by cumulating the substrate volume from the minimum substrate diameter to a particular substrate diameter.

3. The ceramic honeycomb structure according to claim 1, wherein in the three-dimensional structure of said cell wall substrates determined by X-ray CT, a substrate diameter d50 at a cumulative substrate volume corresponding to 50% of the total substrate volume, which is determined from a substrate volume distribution against the diameter of said substrate unit, is 10-20 μm, wherein
   one substrate unit is a substrate portion between two adjacent branch points, which has the substrate diameter and the substrate volume;
   said substrate diameter is determined by halving a sum of short and long diameters of said substrate unit in its transverse cross section; and
   said cumulative substrate volume is determined by cumulating the substrate volume from the minimum substrate diameter to a particular substrate diameter.

4. The ceramic honeycomb structure according to claim 1, wherein in the three-dimensional structure of said cell wall substrates determined by X-ray CT, a substrate diameter d10 at a cumulative substrate volume corresponding to 10% of the total substrate volume, which is determined from a substrate volume distribution against the diameter of said substrate unit, is 8 μm or more, wherein
   one substrate unit is a substrate portion between two adjacent branch points, which has the substrate diameter and the substrate volume;
   said substrate diameter is determined by halving a sum of short and long diameters of said substrate unit in its transverse cross section; and said cumulative substrate volume is determined by cumulating the substrate volume from the minimum substrate diameter to a particular substrate diameter.

5. The ceramic honeycomb structure according to claim 1, wherein said ceramic is a cordierite-type ceramic.

* * * * *